United States Patent
Siegel

(10) Patent No.: US 6,855,740 B2
(45) Date of Patent: Feb. 15, 2005

(54) FOAMED MOLDED BODIES MADE FROM SILICON AND USE OF SAID PRODUCED PRODUCTS

(75) Inventor: Rolf Siegel, Würzburg (DE)

(73) Assignee: Stuemed GmbH, Tuttlingen (DE)

( * ) Notice: Subject to any disclaimer, the term of this patent is extended or adjusted under 35 U.S.C. 154(b) by 0 days.

(21) Appl. No.: 10/469,045

(22) PCT Filed: Feb. 26, 2002

(86) PCT No.: PCT/EP02/01985

§ 371 (c)(1),
(2), (4) Date: Feb. 13, 2004

(87) PCT Pub. No.: WO02/072679

PCT Pub. Date: Sep. 19, 2002

(65) Prior Publication Data

US 2004/0157943 A1 Aug. 12, 2004

(30) Foreign Application Priority Data

Feb. 27, 2001 (DE) .......................... 101 09 215

(51) Int. Cl.⁷ .................................. C08J 9/08
(52) U.S. Cl. .................... 521/92; 521/123; 521/134; 521/154; 264/45.5
(58) Field of Search .................. 521/92, 123, 134, 521/154, 94; 264/45.5

(56) References Cited

U.S. PATENT DOCUMENTS 5,721,300 A * 2/1998 Knies et al. ................. 524/200
5,985,947 A * 11/1999 Hagen ......................... 521/97

FOREIGN PATENT DOCUMENTS

| CA | 2308568 | 5/2000 |
|---|---|---|
| DE | 197 50 697 | 5/1999 |

* cited by examiner

*Primary Examiner*—Morton Foelak
(74) *Attorney, Agent, or Firm*—Dickstein, Shapiro, Morin & Oshinsky, L.L.P.

(57) ABSTRACT

Molded foam bodies made of silicone can be produced in large series by means of known injection molding machines for liquid silicone by virtue of the fact that mixtures of ammonium carbonate, and/or ammonium carbaminate, and/or ammonium hydrogen carbonate, in powdered form, and at least one of the two liquid-paste-like components of liquid silicone are produced and the two liquid silicone components are then processed in the known manner, with the proviso that the mold is not completely filled with the dispersion.

18 Claims, No Drawings

FOAMED MOLDED BODIES MADE FROM SILICON AND USE OF SAID PRODUCED PRODUCTS

FIELD OF THE INVENTION

The invention relates to a process for the production of molded foam bodies, from silicone, especially silicone rubber, as well as the use of the products produced therefrom.

BACKGROUND OF THE INVENTION

Silicones can be divided according to their areas of application into oils, resins, and rubbers. Silicone oils, which are processed into emulsions, anti-foaming agents, pastes, greases, and the like, are linear polydimethyl siloxanes. Silicone resins are more or less cross-linked polymethyl or polymethyiphenyl siloxanes, whose elasticity and thermal resistance increases with the content of phenyl groups. Silicone resins are processed, for example, to produce lacquers, to coat household utensils, and as laminates. Silicone rubbers are masses that are convertible to the elastic, rubber state, which contain, as basic polymers, polydiorganosiloxanes, which exhibit groups that are accessible to cross-linking reactions. Silicone rubbers differ from other types of rubbers by virtue of the fact that they are not purely organic compounds. Their structure imparts their unique properties to the silicone rubbers. Generally, a distinction is drawn between hot-vulcanizing (HTV) and cold-vulcanizing (RTV) silicone rubbers.

Among the cold-hardening RTV silicone rubber masses, a distinction may be drawn between single and dual component systems. In the case of single component silicone rubber (RTV-1), the mass polymerizes slowly at room temperature under the influence of the moisture in the air, whereby the cross-linking occurs as a result of the condensation of SiOH groups, forming Si—O bonds. The SiOH groups are formed as a result of the hydrolysis of SiX groups of a species that occurs intermedially from a polymer with OH groups in terminal position and a cross-linking agent. In the case of the dual component rubbers (RTV-2), mixtures of silicic acid esters and organic stannous compounds are used.

The HTV silicone rubbers represent, in most cases, materials that can be molded plastically, which contain highly dispersed silicic acid plus organic peroxides as cross-linking catalysts, and yield heat-resistant elastic silicone elastomers (silicone rubber) after vulcanization at temperatures in excess of 100° C. Another cross-linking mechanism consists of the addition of Si—H-groups to Si-bonded vinyl groups, both of which are built into the polymer groups or at their end, respectively. In the case of HTV silicone rubbers, in addition, radiation cross-linking is known. Since 1980, a liquid silicone rubber (LSR) technology has been established, in which two liquid silicone rubber components are vulcanized in injection molding machines by way of addition cross-linking.

Liquid silicone rubbers (LSR's), because of their particular material properties, open up new areas of application in elastomer processing. Thus, new elastomer-thermoplast composites can expand the spectrum of silicone rubbers known thus far.

The technology for large-scale serial production of solid molded bodies from silicone rubber by using liquid silicone is known as injection molding (liquid injection molding, LIM). The liquid injection molding process affords the advantage that complex pieces can be configured in a flexible manner, that pre-heating is not necessary, that after setting, no shrinkage of the molded bodies occurs, and less material is needed.

On injection molding machines (that work completely automatically), first, two liquid-paste-like silicone pre-polymers are thoroughly mixed with one another at room temperature using a static mixer, and then pressed into a mold under high pressure. As a result of heating the mold, because of the addition reaction between the two components, a three-dimensional cross-linking of the silicone pre-polymers to the solid, fully-molded silicone polymer, to the molded body made of silicone, results (see the corporate prospectuses of the firm of Wacker Burghausen regarding ELASTOSIL® LR, or GE BAYER Silicones, Leverkusen, regarding SILOPREN® LSR, or Battenfeld Meinerzhagen regarding injection molding machinery for liquid silicone). Frequently, these injection-molding machines exhibit dosage apparatuses, so-called multi-component dosage apparatuses, for the homogeneous admixture of colors or other additives, to the two liquid-paste-like silicone pre-polymers.

Molded foam bodies made of silicone, silicone rubber, for example, such as profiles or stoppers for bacterial culture bottles, and processes for their production, are known.

The Japanese patent application Sho 44-461 (461/1969) describes moldable, sponge-like silicone rubber compositions that contain a thermally degradable swelling agent, especially azobisisobutyonitrile. As a result of the degradation of the swelling agent, substances are produced that are harmful to human beings and must be regarded, therefore, as problematical from the standpoint of environmental pollution.

The Japanese patent application Hei 10-36544 (36,544/1998) describes a moldable, sponge-like silicone rubber composition that comprises hollow thermoplastic silicone resin particles that are mixed into the liquid silicone composition whereby during the polymerization, gases develop and in this way, produce pores in the molded body. The silicone rubber sponge that is produced in this manner possesses just slight mechanical strength; accordingly, this sponge's uses are limited.

The U.S. Pat. No. 6,299,952 describes a moldable silicone rubber sponge composition, which also comprises thermoplastic resin spherules that contain gas.

Likewise, a process is known in which, initially, liquids having a low boiling point are mixed with silicone pre-polymers that are not cross-linked. At issue in the case of these liquids, for example, are methylene chloride, HALON® (polytetrafluoroethylene), hepatane, and trichloroethylene. The mixture obtained is then filled into a mold in such a manner that the quantity filled makes up just a percentage of the mold's volume. The mold is then exposed to elevated temperatures. In the process, the liquid evaporates, as a result of which the silicone polymer swells up and fills the mold completely. As a result of the temperature increase, the silicone pre-polymer cross-links increasingly to a silicone polymer, so that a molded foam body that has the contours of the mold results. Thus far, this technology has not prevailed for large-scale serial production of molded foam bodies, since the admixture of liquids having a low boiling point to silicone pre-polymers is disadvantageous. The liquids that can be mixed with silicone pre-polymers are either readily flammable, so that work must proceed under conditions that afford protection from explosions, or they are harmful to the environment, such as the chlorinated or fluorinated chain hydrocarbons, FCHC's.

BRIEF SUMMARY OF THE INVENTION

The underlying technical problem of the present invention consists of providing means and processes for the production of molded foam bodies out of silicone, especially silicone rubber, whereby the molded bodies, when using known processes, especially the liquid injection molding process, can be produced in a simple and cost-effective manner, and they exhibit sufficient mechanical stability and whereby in the course of the production, the disadvantages that are known in the state of the art are avoided.

DETAILED DESCRIPTION OF THE INVENTION

The present invention solves its underlying problem by providing a process for the production of a molded foam body out of silicone rubber whereby a dual-component liquid silicone composition is thermally heated in the injection molding apparatus, and vulcanized in a cavity of the injection-molding apparatus that imparts shape, whereby prior to the thermal treatment, at least one liquid silicone component is mixed with an ammonium compound.

Thus, according to the invention, the problem is solved by virtue of the fact that a mixture of an ammonium compound is produced in at least one of the two liquid-paste-like components of liquid silicone, preferably of an addition-cross-linking dual component liquid silicone rubber, and then processed with the aid of injection mold machinery for liquid silicone. As a result of the thermal treatment of the liquid silicone, a sublimation of the ammonium compound occurs, that is, the latter makes the transition from the solid state to the gaseous state. The gas that occurs in the process, or rather, the gaseous reaction products that occur in the process, function as swelling agents, so that within the polymerizing silicone composition, open and/or closed cells arise throughout the entire mass.

The ammonium compounds that are used preferably according to the invention, ammonium carbonate, ammonium carbaminate, and ammonium hydrogen carbonate, are known, non-toxic crystalline chemicals, which are used, among other things, in the foodstuffs technology as leavening agents, such as baking powder, for example. The solid ammonium hydrogen carbonate, which is used, preferably, makes the transition to the gaseous phase at ca. 108° C., without becoming liquid. The reaction products that occur in the process are carbon dioxide, ammonia, and water vapor, reaction products, thus, that are frequently encountered in the environment. Ammonia, which occurs in higher concentrations, and is characterized by its pungent odor, can be readily neutralized by drawing it off and making contact with hydrochloric acid. Surprisingly, it has also been shown that ammonium carbonate, ammonium carbaminate, and ammonium hydrogen carbonate, or rather, the reaction products that occur at higher temperatures, do not intoxicate the (platinum) catalysts of the addition cross-linking dual component silicone.

The production of a mixture of the aforementioned ammonium compounds in at least one of the two liquid-paste-like components of the liquid silicone, for example, the addition-cross-linking dual component liquid silicone rubber occurs, according to the invention, by virtue of the fact that a powder of these compounds, whose particulate size, preferably, lies in the lower micrometer range, preferably below 50 $\mu$m, is homogeneously mixed into at least one component of the dual component silicone.

If these ammonium compounds in powder form should be mixed, in a homogeneous fashion, into a silicone component having a higher viscosity, for example, over 150,000 mPa*s, in the preferred embodiment of the invention, they are pre-dispersed into silicone oil, whose viscosity lies, to good advantage, between 100 and 3000 mPa*s. The resultant dispersion that is obtained can then be readily mixed into the silicone components; it serves as an inert aid to distribution of the ammonium compounds and it can later be easily removed again by tempering the molded foam body.

In a particularly advantageous and particularly preferred embodiment of the invention, molded foam bodies can be produced with injection molding machines that are equipped with a dosage apparatus for the admixture of colors or other additives to both silicone components. The ammonium compounds are dispersed into silicone oil, and the dosage apparatus is equipped with this dispersion, so that instead of colored pigments, the ammonium compounds are mixed in with both liquid-paste-like silicone components of the addition-cross-linking dual component silicone.

The concentration of the ammonium compounds in the liquid-paste-like silicone components or in the silicone oil can be varied across wide ranges, and it lies between 0.1 and 50% by weight (relative to the total mass of the silicone to be processed), preferably, especially, between 2 and 8% by weight, and most particularly preferably, at 10% by weight. In the case of the especially preferred use of a dosage apparatus, a "saturated" dispersion of the ammonium compounds in silicone oil is used, that is, the ammonium compounds are dispersed in a certain volume of silicone oil until the ammonium compound and silicone oil form a homogeneous paste, and no clear silicone oil can be seen any longer.

The production of the molded foam bodies from silicone corresponds, substantially, to that of injection molding of solid silicone molded bodies by means of injection molding machines, with the difference, however, that according to the invention, the injection mold or shape-imparting cavity is not completely filled with silicone into which the ammonium compounds are dispersed. The extent of the filling of the mold can be varied in wide ranges by means of the dosage technology that is present in the injection molding machines, and it can be adapted to the desired properties of the molded foam body: slight filling of the mold corresponds to molded foam bodies of little hardness, a more complete filling of the mold corresponds to molded bodies having greater hardness.

The process for the production of molded foam bodies according to the invention occurs, preferably, by using initial addition cross-linking silicone rubber materials, especially addition cross-linking dual component liquid silicone rubber compositions. In a particularly preferred embodiment of the invention, commercially available compositions, such as SILOPREN®LSR are used. In a further embodiment of the invention, the process according to the invention can also be performed by using initial materials made of peroxide cross-linking silicone rubber.

Another preferred embodiment of the invention pertains to the molded foam bodies made of silicone rubber that are produced by using the process according to the invention. In conjunction with the present invention, "molded foam bodies" is taken to mean molded bodies having open and/or closed cells or pores across their entire mass. Molded foam bodies exhibit a raw density that is less than that of the silicone rubber substance that provides the framework. The molded bodies that are produced according to the invention are distinguished by an excellent mechanical stability.

According to the invention, molded bodies that are produced in this way can be used as insulation material against thermal or acoustic effects, as packing material, as absorber material against shock and impact, as absorber material to absorb fluids, especially homopolar fluids, such as (mineral) oil, as an absorber material for gases and/or solvent vapors, as cushioning material, for example, as a mattress, a mattress overlay, or as pillows, as a medical product, for example, as non-adhesive nasal, aural, anal, fistula, or wound tamponade, and as stoppers for bacteria culture bottles.

Ammonium hydrogen carbonate (the firm of Fluka), having a particle size of <50 μm, which is produced by rubbing on a steel sieve of the corresponding size, is dispersed by adding and stirring in silicone oil having a viscosity of ca. 1,000 $mm^{2*}s^{-1}$ (Dow Coming® Dimeticone Fluid) until a homogeneous paste results. The paste is filled into the dosage apparatus of a multi-component dosage apparatus (the firm of 2-Komponenten Maschinenbau, Marienheide-Rodt that is provided for the admixture of color. The multi-component dosage apparatus is an integral component of an injection molding machine for dual component liquid silicone rubber (firm of Aarburg, Loβburg) on which dual component liquid silicone rubber by GE BAYER, Leverkusen SILOPREN®LSR 4030 is processed to solid molded bodies.

The production of molded foam bodies occurs by virtue of the fact that the dispersion of ammonium hydrogen carbonate in silicone oil is added to liquid silicone as an admixture by means of the dosage apparatus, and simultaneously, the filling volume of the mold is reduced to ca. 35%. The other process parameters are substantially identical to the process parameters that are used for the production of solid molded bodies. The properties of the molded foam body—hardness, porosity, pore size—can be adjusted across wide ranges by suitable selection of the dual component liquid silicone rubbers, the quantity of dispersion added to the mixture, and the filling volume of the mold. The molded foam bodies exhibit a skin, the structure of the pores is predominantly closed-celled.

What is claimed is:

1. A process for producing molded foam bodies out of silicone rubber whereby a dual component liquid silicone composition is heated thermally in an injection-molding apparatus and is vulcanized in a shape-imparting cavity, whereby prior to the thermal treatment, at least one liquid silicone component is mixed with an ammonium compound, characterized in that the ammonium compound, prior to the mixing, is dispersed in silicone oil and, by using a dosage apparatus, mixed with the liquid silicone component.

2. A process according to claim 1, characterized in that the ammonium compound is ground to a powder prior to mixing.

3. A process according to claim 1, characterized in that the ammonium compound is selected from the group comprising ammonium carbaminate, ammonium carbonate, and ammonium hydrogen carbonate.

4. A process according to claim 1, whereby the dual component liquid silicone rubber is an addition cross-linking silicone rubber.

5. A process according to claim 1, whereby the dual component liquid silicone rubber is a peroxide cross-linking silicone rubber.

6. A process according to claim 1, whereby the cavity of the injection-molding device, which imparts shape, is not completely filled with the thermally treated components of the liquid silicone.

7. A molded foam body made of silicone rubber that may be produced in accordance with a process according to claim 1.

8. The method of using a molded foam body produced according to claim 1 as insulation material against thermal or acoustic effects, as packing material, as absorber material against shock and impact, as absorber material to absorb fluids, as an absorber material for gases and/or solvent vapors, as cushioning material, as a medical product, and as stoppers for bacterial culture bottles.

9. The method of claim 8, wherein said absorber material to absorb fluid is a homopolar fluid.

10. The method of claim 9, wherein said homopolar fluid is mineral oil.

11. The method of claim 8, wherein said cushioning material is selected from the group consisting of a mattress, a mattress overlay, or a pillow.

12. The method of claim 8, wherein said medical product is a non-adhesive nasal, aural, anal, fistula, or wound tamponade.

13. A process according to claim 2, characterized in that the ammonium compound is ground to a powder having a particle size below 50 μm.

14. A process according to claim 2, characterized in that the silicon oil has a viscosity between 100 and 3000 mPa*s.

15. A process according to claim 2, characterized in that the ammonium compound is dispersed in the silicon oil to saturation.

16. A process according to claim 15, characterized in that the ammonium compound is selected from the group comprising ammonium carbaminate, ammonium carbonate, and ammonium hydrogen carbonate.

17. A process according to claim 15, whereby the dual component liquid silicone rubber is an addition cross-linking dual component liquid silicone rubber.

18. A process according to claim 15, whereby the dual component liquid silicone rubber is a peroxide cross-linking dual component liquid silicone rubber.

* * * * *